(12) United States Patent
Schaefer et al.

(10) Patent No.: US 12,724,992 B2
(45) Date of Patent: Sep. 1, 2026

(54) READOUT OF OPTICALLY READABLE CODES

(71) Applicant: BAYER AKTIENGESELLSCHAFT, Leverkusen (DE)

(72) Inventors: Dirk Schaefer, Leverkusen (DE); Benjamin Hoetter, Overath (DE); Gregor Fischer, Overath (DE); Klaus Ruelberg, Overath (DE)

(73) Assignee: BAYER AKTIENGESELLSCHAFT, Leverkusen (DE)

( * ) Notice: Subject to any disclaimer, the term of this patent is extended or adjusted under 35 U.S.C. 154(b) by 147 days.

(21) Appl. No.: 18/722,360

(22) PCT Filed: Dec. 15, 2022

(86) PCT No.: PCT/EP2022/086140
§ 371 (c)(1),
(2) Date: Jun. 20, 2024

(87) PCT Pub. No.: WO2023/117688
PCT Pub. Date: Jun. 29, 2023

(65) Prior Publication Data

US 2026/0161907 A1 Jun. 11, 2026

(30) Foreign Application Priority Data

Dec. 22, 2021 (EP) .................................... 21216812
Dec. 22, 2021 (EP) .................................... 21216923
Feb. 10, 2022 (EP) .................................... 22156217

(51) Int. Cl.
*G06K 7/14* (2006.01)

(52) U.S. Cl.
CPC .......... *G06K 7/1417* (2013.01); *G06K 7/146* (2013.01)

(58) Field of Classification Search
None
See application file for complete search history.

(56) References Cited

U.S. PATENT DOCUMENTS 5,660,747 A 8/1997 Drouillard et al.
5,757,950 A 5/1998 Bruder
(Continued)

FOREIGN PATENT DOCUMENTS

DE 102005019008 A1 10/2006
EP 1737306 A2 1/2007
(Continued)

OTHER PUBLICATIONS

Cumo, Christopher, "Encyclopedia of Cultivated Plants: From Acacia to Zinnia" 2013, ISBN 9781598847758.
(Continued)

*Primary Examiner* — Kristy A Haupt
(74) *Attorney, Agent, or Firm* — Michael VanEngelen

(57) ABSTRACT

The present invention relates to the technical field of the marking of articles by means of optically readable codes and of decoding the codes. Such a code is introduced into a surface of an article. The code is decoded on the basis of a transformed captured image of the code. The transformed captured image is generated from at least one captured image of the code using a machine learning model. The model is trained to generate a transformed captured image from at least one captured image and the readout of the optically readable code leads to less decoding errors than the readout of the code in the at least one captured image. The present invention relates to a method for training the machine learning model and to a method, a system and a computer program product for decoding a code using the trained machine learning model.

15 Claims, 4 Drawing Sheets

(56) References Cited

U.S. PATENT DOCUMENTS

Figure 1:
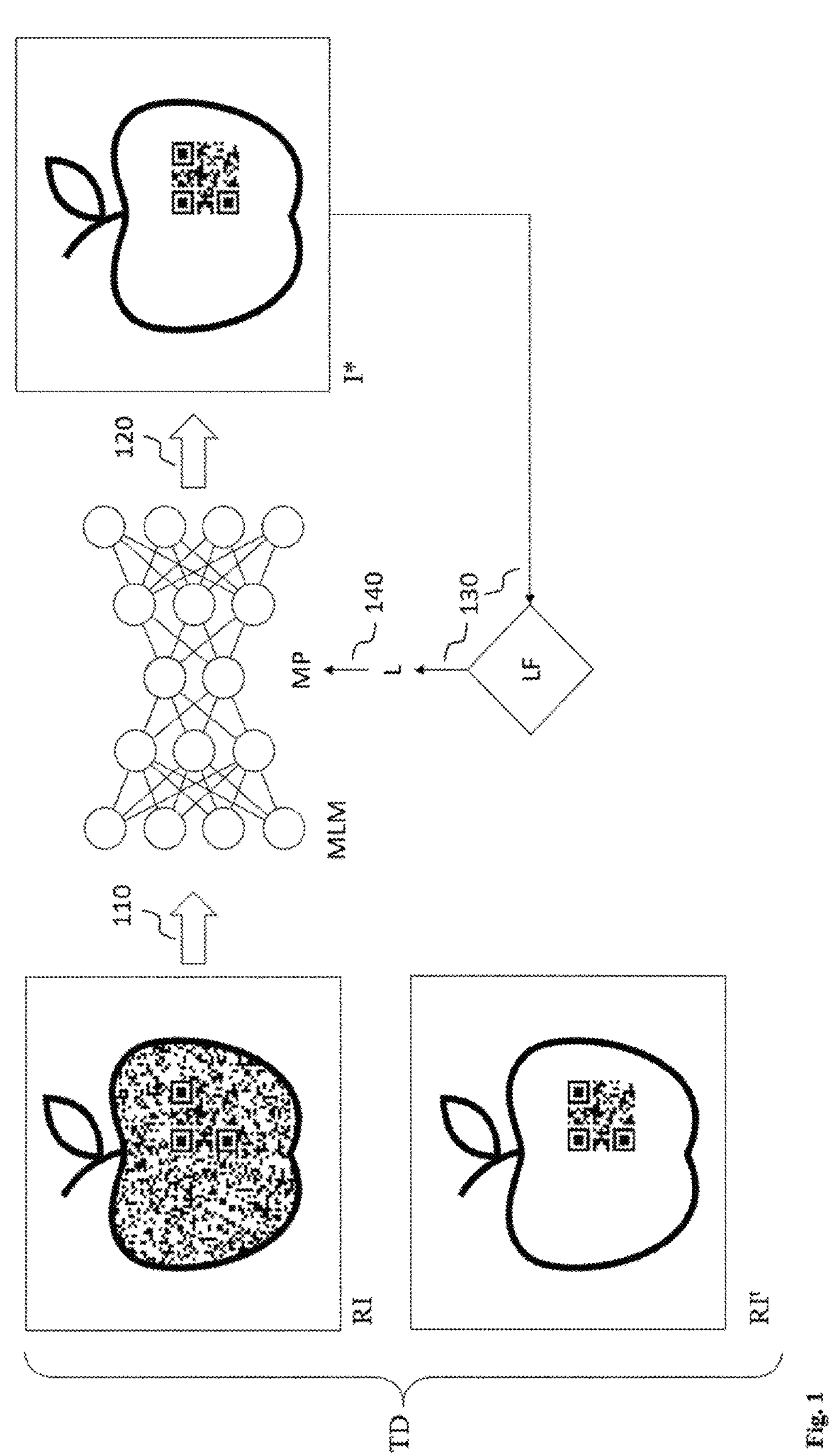

| | | | |
|---|---|---|---|
| 10,481,589 B1 | 11/2019 | Drouillard | |
| 2008/0124433 A1 | 5/2008 | Yelden et al. | |
| 2012/0211555 A1 | 8/2012 | Rowe | |
| 2018/0268214 A1* | 9/2018 | Kutter | G06V 20/80 |
| 2020/0175317 A1 | 6/2020 | Iwami | |
| 2021/0012076 A1 | 1/2021 | Barkan et al. | |
| 2021/0150690 A1* | 5/2021 | Kohlert | G06T 7/80 |
| 2022/0076851 A1* | 3/2022 | Kamangar | G06Q 30/0633 |

FOREIGN PATENT DOCUMENTS

| | | |
|---|---|---|
| EP | 2281468 A1 | 2/2011 |
| EP | 3640901 A1 | 4/2020 |
| EP | 3896629 A1 | 10/2021 |
| GB | 2585938 A | 1/2021 |
| JP | 2005138140 A | 6/2005 |
| JP | 2021184141 A | 12/2021 |
| WO | 2007130968 A2 | 11/2007 |
| WO | 2015117438 A1 | 8/2015 |
| WO | 2015117541 A1 | 8/2015 |
| WO | 2016118962 A1 | 7/2016 |
| WO | 2016118973 A1 | 7/2016 |
| WO | 2019145390 A1 | 8/2019 |
| WO | 2020119301 A1 | 6/2020 |

OTHER PUBLICATIONS

Directive 2001/83/EC of the European Parliament and of the Council of Nov. 6, 2001 on the Community code related to medicinal products for human use, Official Journal of the European Communities, (Year: 2001).

Directive 2011/62/EU of the European Parliament and of the Council of Jun. 8, 2011, amending Directive 2001/83/EC on the Community code relating to medicinal products for human use, as regards the prevention of the entry into the legal supply chain of falsified medicinal products, Official Journal of the European Union, (Year: 2011).

Etxeberria, E. et al., "Anatomical and Morphological Characteristics of Laser Etching Depressions for Fruit Labeling" HortTechnology, Technology Product Reports 16(3) (Year: 2006).

International Preliminary Report on Patentability from International Application No. PCT/EP2022/086139, issued Jun. 20, 2024.

International Preliminary Report on Patentability from International Application No. PCT/EP2022/086140, issued Jun. 20, 2024.

Khan, A. et al., "A survey of the recent architectures of deep convolutional neural networks" Artificial Intelligence Review, 53:5455-5516 (Year: 2020).

Sultana, F. et al., "Advancements in Image Classification using Convolutional Neural Network" Fourth International Conference on Research in Computational Intelligence and Communication Networks (2019).

* cited by examiner

I*
120
110
MLM
140
MP
L
130
LF
RI
RI'
TD

READOUT OF OPTICALLY READABLE CODES

The present application is a 35 U.S.C. § 371 national phase entry of International Application No. PCT/EP2022/086140, filed on Dec. 15, 2022, which claims priority to European Patent Application Nos. 21216812.4, filed Dec. 22, 2021, 21216923.9, filed Dec. 22, 2021, and 22156217.6, filed Feb. 10, 2022, the contents of each of which are hereby incorporated by reference in their entirety.

The present invention is concerned with the technical field of marking objects with optically readable codes and reading out (decoding) the codes.

The tracking of goods and products plays an important part in many areas of the economy. Products and goods or their packagings and/or containers are provided with a unique identifier (e.g. a serial number) (serialization) in order to be able to track them along their supply chain and to capture incoming and outgoing products by machine (see e.g. U.S. Pat. No. 10,140,492B1, CN112434544A).

In many cases, the identifier is applied in an optically readable form, e.g. in the form of a barcode (e.g. EAN-8 barcode) or a matrix code (e.g. QR code), on the products and goods or their packagings and/or containers. The barcode or matrix code often conceals a serial number that usually provides information about the kind of product or good and about the origin.

In the case of some pharmaceutical products, an individual marking of individual packs is even required. Pursuant to Article 54a para. 1 of Directive 2001/83/EC amended by what is called EU Falsified Medicines Directive 2011/62/EU (FMD), at least medicinal products subject to prescription should be marked with an individual recognition feature (referred to as: Unique Identifier) which makes it possible in particular to check the authenticity and to identify individual packs.

Plant and animal products are usually only provided with a serial code. In the case of plant and animal products, a marking is usually applied or attached to a packaging and/or a container for example in the form of stickers or imprints.

In some cases, identifiers are also applied directly to plant or animal products. In the European Union, for example, eggs are provided with a producer code, from which the chicken husbandry, the country from which the egg originates, and the business from which the egg originates can be derived. The skin of fruit and vegetable units are increasingly also being provided with a marking (see e.g.: E. Etxeberria et al.: *Anatomical and Morphological Characteristics of Laser Etching Depressions for Fruit Labeling,* 2006, HortTechnology. 16, 10.21273/HORTTECH.16.3.0527).

Consumers are showing increasing interest in the origin and the supply chain of plant and animal products. They want to know for example from where the respective product originates, whether and how it was treated (e.g. with crop protection compositions), how long transport lasted, what conditions prevailed during transport and/or the like.

EP3896629A1 proposes providing plant and animal products with a unique identifier in the form of an optically readable code. The code can be read by a consumer for example by way of the camera of his/her smartphone. On the basis of the code read out, various items of information concerning the plant or animal product can be displayed to the consumer. EP3896629A1 proposes introducing the optically readable code into a surface of the plant or animal product by means of a laser, for example. An optical code introduced into the surface of a plant or animal product has a lower contrast with respect to the surrounding tissue and is thus more difficult to read out than for example an optical code applied with a black colour on a white background, as is usually present in the case of stickers or tags. Furthermore, optical codes on different objects have a different appearance. If optically readable codes are applied to curved surfaces, for example, such as are present in the case of many fruits and types of vegetables, by means of a laser, a distortion of the codes can occur, and hampers readout. If optically readable codes are applied to smooth surfaces, reflections (e.g. as a result of ambient light) can occur on the surface during readout, and hamper readout. Surfaces of fruits and vegetables may be non-uniform; apples, for example, may have bitter pits and spots. Potatoes may have unevennesses. Such non-uniformities and unevennesses can hamper readout of codes.

The problem addressed is therefore that of providing means by which optically readable codes on a multiplicity of different objects, in particular on a multiplicity of plant and animal products, can be reliably read out by a consumer using simple means, such as a smartphone, for example.

This problem is solved by the subjects of the independent claims. Preferred embodiments are found in the dependent claims, the present description and the drawings.

A first subject of the present invention is a method for training a machine learning model, comprising:

- providing training data, wherein the training data for each object of a multiplicity of objects comprise i) at least one reference image recording of an optical code which is introduced into a surface of the object, and ii) a transformed reference image recording of the optical code,
- providing a machine learning model, wherein the machine learning model is configured to generate a second image recording on the basis of at least one first image recording and on the basis of model parameters,
- training the machine learning model, wherein the training for each object of the multiplicity of objects comprises:
  - inputting the at least one reference image recording into the machine learning model,
  - receiving a predicted transformed reference image recording from the machine learning model,
  - calculating a deviation between the transformed reference image recording and the predicted transformed reference image recording,
  - modifying the model parameters with regard to reducing the deviation,
- storing and/or outputting the trained machine learning model and/or transmitting the trained machine learning model to a separate computer system and/or using the trained machine learning model to generate a transformed image recording of at least one new image recording of an object.

A further subject of the present invention is a computer-implemented method for decoding an optically readable code which is introduced into a surface of an object:

- receiving an image recording of the optically readable code,
- feeding the image recording to a trained machine learning model, wherein the trained machine learning model has been trained using training data, wherein the training data for each object of a multiplicity of objects comprise i) at least one reference image recording of an optical code which is introduced into a surface of the object, and ii) a transformed reference image recording of the optical code, wherein decoding the optical code in the transformed reference image recording generates fewer decoding errors than decoding the optical code in the reference image recording, wherein the training for each object of the multiplicity of objects comprises:

inputting the at least one reference image recording into the machine learning model, receiving a predicted transformed reference image recording from the machine learning model, calculating a deviation between the transformed reference image recording and the predicted transformed reference image recording, modifying the model parameters with regard to reducing the deviation, receiving a transformed image recording from the machine learning model, decoding the optically readable code imaged in the transformed image recording.

A further subject of the present invention is a system comprising at least one processor, wherein the processor is configured to receive an image recording of an optically readable code, wherein the optically readable code is introduced into a surface of an object, to feed the image recording to a trained machine learning model, wherein the trained machine learning model has been trained using training data, wherein the training data for each object of a multiplicity of objects comprise i) at least one reference image recording of an optical code which is introduced into a surface of the object, and ii) a transformed reference image recording of the optical code, wherein decoding the optical code in the transformed reference image recording generates fewer decoding errors than decoding the optical code in the reference image recording, wherein the training for each object of the multiplicity of objects comprises:

inputting the at least one reference image recording into the machine learning model, receiving a predicted transformed reference image recording from the machine learning model, calculating a deviation between the transformed reference image recording and the predicted transformed reference image recording, modifying the model parameters with regard to reducing the deviation, to receive a transformed image recording from the machine learning model, to decode the optically readable code imaged in the transformed image recording.

A further subject of the present invention is a computer program product comprising a data carrier on which a computer program is stored, wherein the computer program can be loaded into a main memory of a computer, where it causes the computer to execute the following steps:

receiving an image recording of the optically readable code, feeding the image recording to a trained machine learning model, wherein the trained machine learning model has been trained using training data, wherein the training data for each object of a multiplicity of objects comprise i) at least one reference image recording of an optical code which is introduced into a surface of the object, and ii) a transformed reference image recording of the optical code, wherein decoding the optical code in the transformed reference image recording generates fewer decoding errors than decoding the optical code in the reference image recording, wherein the training for each object of the multiplicity of objects comprises:

inputting the at least one reference image recording into the machine learning model, receiving a predicted transformed reference image recording from the machine learning model, calculating a deviation between the transformed reference image recording and the predicted transformed reference image recording, modifying the model parameters with regard to reducing the deviation, receiving a transformed image recording from the machine learning model, decoding the optically readable code imaged in the transformed image recording.

The invention is explained in more detail below without distinguishing between the subjects of the invention (training method, decoding method, system, computer program product). The explanations that follow shall instead apply analogously to all subjects of the invention, regardless of the context (training method, decoding method, system, computer program product) in which they are provided.

Where steps are stated in an order in the present description or in the claims, this does not necessarily mean that the invention is limited to the order stated. Instead, it is conceivable that the steps are also executed in a different order or else in parallel with one another, unless one step builds on another step, which absolutely requires that the step building on the previous step be executed subsequently (which will however become clear in the individual case). The orders stated are thus preferred embodiments of the invention.

The present invention provides means for reading out (decoding) an optically readable code. The terms “reading out” and “decoding” are used synonymously in this description.

The term “optically readable code” is understood to mean markings that can be captured with the aid of a camera and be converted into alphanumeric characters, for example.

Examples of optically readable codes are barcodes, stacked codes, composite codes, matrix codes and 3D codes. Alphanumeric characters that can be captured (interpreted, read) and digitized by means of automated text recognition (referred to as optical character recognition, abbreviated to: OCR) also come under the term optically readable codes.

Optically readable codes belong to the machine-readable codes, i.e. to codes which can be captured and processed by means of a machine. In the case of optically readable codes, such a “machine” usually comprises a camera.

A camera usually comprises an image sensor and optical elements. The image sensor is a device for recording two-dimensional images from light by electrical means. This usually involves a semiconductor-based image sensor, for example a CCD (CCD=charge-coupled device) or CMOS sensor (CMOS=complementary metal oxide semiconductor). The optical elements (lenses, stops and the like) serve for maximum sharpness of imaging of the object of which a digital image recording is to be generated on the image sensor.

Optically readable codes have the advantage that they can be read out by many consumers using simple means. In this regard, many consumers have for example a smartphone equipped with one or more cameras. By means of such a camera, it is possible to generate an image representation of the optically readable code on the image sensor. The image representation can be digitized and processed and/or stored by a computer program stored on the smartphone. Such a computer program can be configured to identify and to interpret the optically readable code, i.e. to translate it into a different form such as, for example, into a number sequence, a sequence of letters and/or the like, depending on what information is present in the form of the optically readable code.

The optically readable code is introduced into a surface of an object. Such an object is a real, physical, tangible object. Such an object can be a natural object or an industrially produced object. Examples of objects within the meaning of the present invention are: Tools, machine components, circuit boards, chips, containers, packagings, jewellery, design objects, art objects, medicaments (e.g. in the form of tablets), medicament packagings and also plant and animal products.

In one preferred embodiment of the present invention, the object is a medicament (e.g. in the form of a tablet or capsule) or a medicament packaging.

In a further preferred embodiment of the present invention, the object is an industrially produced product such as, a component for a machine.

In a further preferred embodiment of the present invention, the object is a plant or animal product.

A plant product is an individual plant or a part of a plant (e.g. a fruit) or a group of plants or a group of parts of a plant. An animal product is an animal or a part of an animal or a group of animals or a group of parts of an animal or an object which has been produced by an animal (such as e.g. a hen's egg). Industrially processed products such as, for example, cheese and sausage products are also intended to come under the term plant or animal product.

The plant or animal product is usually a part of a plant or of an animal which is suitable and/or intended for consumption by a human being or an animal.

The plant product is preferably at least a part of a crop plant. The term "crop plant" is understood to mean a plant which is specifically grown as a useful plant by human intervention. In one preferred embodiment, the crop plant is a fruit plant or a vegetable plant. Even though fungi are not regarded biologically as plants, fungi, in particular the fruiting bodies of fungi, are also intended to come under the term plant product.

Preferably, the crop plant is one of the plants listed in the following encyclopaedia: Christopher Cumo: *Encyclopedia of Cultivated Plants: From Acacia to Zinnia*, Volumes 1 to 3, ABC-CLIO, 2013, ISBN 9781598847758.

A plant or animal product can be for example an apple, a pear, a lemon, an orange, a tangerine, a lime, a grapefruit, a kiwi, a banana, a peach, a plum, a mirabelle, an apricot, a tomato, a cabbage (a cauliflower, a white cabbage, a red cabbage, kale, Brussels sprouts or the like), a melon, a pumpkin, a cucumber, a pepper, a zucchini, an aubergine, a potato, a sweet potato, a leek, celery, a kohlrabi, a radish, a carrot, a parsnip, a scorzonera, asparagus, sugar beet, rhubarb, ginger root, a coconut, a Brazil nut, a walnut, a hazelnut, a sweet chestnut, an egg, a fish, a piece of meat, a piece of cheese, a sausage and/or the like.

The optically readable code is introduced into a surface of the object. That means that the optically readable code is not attached to the object in the form of a tag, nor is it applied to the object in the form of a sticker. Instead, a surface of the object was modified such that the surface itself carries the optically readable code.

In the case of plant products and eggs, the surface can be the skin/shell, for example.

The optically readable code can be engraved, etched, burned, impressed into the object and/or introduced into a surface of the object in some other way. Preferably, the optically readable code is introduced into the surface of the object (for example into the skin in the case of a fruit or vegetable) by means of a laser. In this case, the laser can modify (e.g. bleach and/or destroy) dye molecules in the surface of the object and/or lead locally to instances of combustion and/or destruction and/or chemical and/or physical modifications of the tissue (e.g. evaporation of water, denaturing of protein and/or the like), thus giving rise to a contrast with respect to the surrounding part (part not modified by the laser) of the surface.

The optically readable code can also be introduced into a surface of the object by means of a water jet or stream of sand.

The optically readable code can also be introduced into a surface of the object mechanically by scribing, pricking, parting, rasping, scraping, stamping and/or the like.

Details concerning the marking of objects, in particular plant or animal products, can be gathered from the prior art (see, for example, EP2281468A1, WO2015/117438A1, WO2015/117541A1, WO2016/118962A1, WO2016/118973A1, DE102005019008A, WO2007/130968A2, U.S. Pat. No. 5,660,747, EP1737306A2, U.S. Pat. No. 10,481,589, US20080124433).

Preferably, the optically readable code has been introduced into the surface of the object by a carbon dioxide laser ($CO_2$ laser).

Introducing an optically readable code into a surface of an object usually leads to a marking that has a lower contrast than, for example, an optically readable code in the form of a black or coloured imprint on a white sticker. The contrast can be optimized by virtue of the possibility of individual design of the sticker; by way of example, a black marking (e.g. a black barcode or a black matrix code) on a white background has a very high contrast. Such high contrasts are not usually attained by means of introducing optically readable codes into a surface of an object, particularly in the case of plant or animal products and in the case of medicaments. This can lead to difficulties when reading out the codes. Moreover, optically readable codes introduced for example into a surface of an object by means of a laser have a different appearance for different objects. In other words: optically readable codes introduced into an apple, for example, usually have a different appearance from optically readable codes introduced into a banana, a tomato, a pumpkin or a potato. The respective variety of a fruit can also influence the appearance of the optically readable code: optically readable codes in an apple of the "Granny Smith" variety have a different appearance from optically readable codes in an apple of the "Pink Lady" variety. The structure of the surface of a plant or animal product can also influence the appearance of an optically readable code: the comparatively rough surface structure of a kiwi can hamper the readout of an optically readable code in just the same way as unevennesses and spots in the skin of potatoes and apples. The surfaces of fruits and vegetables usually have curvatures. If an optical code is introduced into a curved surface, a distortion of the code can occur; the code can have a pincushion or barrel distortion, for example. Such distortions can hamper the decoding of codes. The extent of a distortion is usually dependent on the degree of curvature in this case. If an optically readable code having a size of 2 cm×2 cm is introduced into an apple, the distortion is greater than if the same code is introduced into a melon. Moreover, the distortions that arise on approximately spherical products (e.g. apple, tomato, melon) are different from those on approximately cylindrical products (e.g. cucumbers). Smooth surfaces (as in the case of apples, for example) produce more reflections (e.g. as a result of ambient light) than rough surfaces (as in the case of a kiwi, for example).

The abovementioned properties of the object (unevennesses, non-uniformities, spots, curved surfaces, smooth (speculatively reflective) surfaces, coloration, texture, surface roughness and/or the like) are also referred to as disturbing factors in this description.

According to the invention, therefore, image recordings of optically readable codes introduced into a surface of an object are subjected to one transformation or to a plurality of transformations before the codes are read out (decoded). Such a transformation can increase the contrast between the optically readable code and the surrounding part of the surface (the part of the surface which does not carry any code) and/or reduce or eliminate distortions and/or reduce or eliminate reflections and/or reduce or eliminate other artefacts attributable to the specific object present.

A "transformation" is a function or an operator which receives an image as input and generates an image as output. The transformation can ensure that an optically readable code imaged in the input image has a higher contrast vis-à-vis its surroundings in the output image than in the input image and/or has less distortion in the output image than in the input image. The transformation can ensure that reflections of light on the surface of the object are reduced in the output image by comparison with the input image. The transformation can ensure that unevennesses and/or non-uniformities on the surface of the object appear less distinctly in the output image than in the input image. Generally, the transformation ensures that the output image generates fewer decoding errors during the decoding of the imaged optically readable code than the input image. Such a decoding error arises for example if a white square of a QR code is interpreted by the image sensor as a black square.

Firstly, an image recording of an optically readable code introduced into a surface of an object is generated. It is also conceivable for a plurality of image recordings of the optically readable code to be generated.

The term "image recording" is preferably understood to mean a two-dimensional image representation of the object or of a part thereof. The image recording is usually a digital image recording. The term "digital" means that the image recording can be processed by a machine, generally a computer system. "Processing" is understood to mean the known methods for electronic data processing (EDP).

Digital image recordings can be processed, edited and reproduced and also converted into standardized data formats, such as JPEG, Portable Network Graphics (PNG) or Scalable Vector Graphics (SVG), for example, by means of computer systems and software. Digital image recordings can be visualized by means of suitable display devices, such as computer monitors, projectors and/or printers, for example.

In a digital image recording, image contents are usually represented by whole numbers and stored. In most cases this involves two-dimensional images which can be binary coded and optionally compressed. The digital image recordings usually involve raster graphics, in which the image information is stored in a uniform raster grid. Raster graphics consist of a raster arrangement of so-called picture elements (pixels) in the case of two-dimensional representations or volume elements (voxels) in the case of three-dimensional representations, to which a colour or a greyscale value is assigned in each case. The main features of a 2D raster graphic are therefore the image size (width and height measured in pixels, also informally called image resolution) and the colour depth. A colour is usually assigned to a pixel of a digital image file. The colour coding used for a pixel is defined, inter alia, in terms of the colour space and the colour depth. The simplest case is a binary image, in which a pixel stores a black-and-white value. In the case of an image, the colour of which is defined in terms of the so-called RGB colour space (RGB stands for the primary colours red, green and blue), each pixel consists of three colour values, one colour value for the colour red, one colour value for the colour green and one colour value for the colour blue. The colour of a pixel arises from the superimposition (additive mixing) of the three colour values. The individual colour value is discretized e.g. into 256 distinguishable levels, which are called tonal values and usually range from 0 to 255. The colour nuance "0" of each colour channel is the darkest. If all three channels have the tonal value 0, the corresponding pixel appears black; if all three channels have the tonal value 255, the corresponding pixel appears white. When carrying out the present invention, digital image recordings are subjected to certain operations (transformations). In this case, the operations predominantly concern the pixels as so-called spatial operators such as an edge detector, for example, or the tonal values of the individual pixels as in the case of colour space transformations, for example. There are a multiplicity of possible digital image formats and colour codings. For simplification, it is assumed in this description that the present images are RGB raster graphics having a specific number of pixels. However, this assumption ought not in any way be understood as limiting. It is clear to a person skilled in the art of image processing how the teaching of this description can be applied to image files which are present in other image formats and/or in which the colour values are coded differently.

The at least one image recording can also be one or more excerpts from a video sequence.

The at least one image recording is generated with the aid of one camera or a plurality of cameras. Preferably, the at least one image recording is generated by one or more cameras of a smartphone.

The use of a plurality of cameras which view an object from different directions and generate image recordings from different viewing directions has the advantage that depth information is captured. By way of example, information about curvatures of the imaged object that are present can be derived and/or gathered from such depth information.

The at least one image recording shows the optically readable code introduced into the surface of the object.

In a next step, a transformed image recording is generated from the image recording. It is conceivable for a plurality of image recordings to be involved in generating a transformed image recording.

A transformed image recording is an image recording which has been subjected to one or more transformations. A transformed image recording can also be an image recording in which one or more image recordings and/or one or more transformed image recordings have been combined to form one image recording.

In the transformed image recording, the same optical code is imaged as in the one or more image recordings which serve to generate the transformed image recording. In the transformed image recording, the optical code is however imaged more distinctly and/or more clearly and/or with fewer distortions and/or with fewer reflections and/or with fewer characteristic features that can lead to decoding errors than in the one or more non-transformed image recordings.

According to the invention, the transformed image recording is generated with the aid of a trained machine learning model.

Such a model can be trained, in a supervised learning method, to generate a transformed image recording from one or more image recordings.

A "machine learning model" can be understood as a computer-implemented data processing architecture. The model can receive input data and supply output data on the basis of said input data and model parameters. The model can learn a relationship between the input data and the output data by means of training. During training, the model parameters can be adapted to supply a desired output for a specific input.

During the training of such a model, the model is presented with training data from which it can learn. The trained machine learning model is the result of the training process. The training data comprise, besides input data, the correct output data (target data) that the model is intended to generate on the basis of the input data. Patterns that map the input data onto the target data are recognized during training.

In the training process, the input data of the training data are input into the model, and the model generates output data. The output data are compared with the target data (so-called ground truth data). Model parameters are altered so as to reduce the deviations between the output data and the target data to a (defined) minimum.

During training, a loss function can be used to assess the prediction quality of the model. The loss function can be chosen such that it rewards a desired relationship between output data and target data and/or punishes an undesired relationship between output data and target data. Such a relationship can be e.g. a similarity, a dissimilarity or some other relationship.

A loss function can be used to calculate a loss for a given pair comprising output data and target data. The aim of the training process can consist in altering (adapting) the parameters of the machine learning model so that the loss for all pairs of the training data set is reduced to a (defined) minimum.

A loss function can quantify e.g. the deviation between the output data of the model for specific input data and the target data. If the output data and the target data are numbers, for example, the loss function can be the absolute difference between these numbers. In this case, a high absolute value of the loss function can mean that one or more model parameters must be changed to a great extent.

In the case of output data in the form of vectors, for example, difference metrics between vectors such as the mean square error, a cosine distance, a norm of the difference vector such as a Euclidean distance, a Chebyshev distance, an Lp norm of a difference vector, a weighted norm or any other type of difference metric of two vectors can be chosen as the loss function.

In the case of higher-dimensional outputs, such as e.g. two-dimensional, three-dimensional or higher-dimensional outputs, e.g. an elementwise difference metric can be used. Alternatively or additionally, the output data can be transformed before the calculation of a loss value, e.g. into a one-dimensional vector.

In the present case, the machine learning model is a model which is configured to generate a second image recording on the basis of one or more first image recordings.

In the present case, the machine learning model can be trained to generate a transformed image recording from one or more image recordings. The training can be carried out on the basis of training data. The training data can comprise a multiplicity of reference image recordings and transformed reference image recordings. The term "reference" is used in this description to differentiate the data used for training the machine learning model from the data used during use of the trained machine model. However, the term is not intended to be in any way restrictive.

The term "multiplicity" preferably means more than 100. The reference image recordings usually show optically readable codes introduced into surfaces of a multiplicity of different specimens of an object. The transformed reference image recordings show the same optically readable codes as the non-transformed reference image recordings. The transformed reference image recordings may have been generated by one or more experts in the field of optical image processing on the basis of the reference image recordings. The one or more experts can apply one or more transformations to the reference image recordings in order to make the optically readable codes appear more distinct and/or clearer and/or with fewer distortions and/or with fewer reflections and/or with fewer characteristic features that can lead to decoding errors than in the case of the non-transformed reference image recordings. The one or more experts can combine a plurality of reference image recordings showing the same optically readable code on the surface of the same object with one another in order to generate a transformed reference image recording. The aim of the transformations and/or combinations is to generate transformed reference image recordings which generate fewer decoding errors than the non-transformed reference image recordings during readout of the imaged optical codes.

The decoding error can be determined empirically. It can be for example the percentage proportion of codes that could not be (correctly) decoded. Thus, for example, if 10 out of 100 codes imaged in 100 reference image recordings could not be decoded or have generated one or more read errors, then the percentage proportion of codes that could not be correctly decoded is 10%. From the 100 reference image recordings, e.g. 100 transformed reference image recordings are generated by one or more image processing experts. The codes imaged in the transformed reference image recordings are decoded. If the experts have done their work correctly, more than 90, ideally all 100, of the 100 codes in the 100 transformed reference image recordings should be decoded correctly.

Many optically readable codes have means for error correction. The decoding error can also signify the number of corrected bits in a code.

One or more image processing experts can stipulate for the reference image recordings transformations which lead to an increase in the contrast of the optically readable code with respect to the surroundings thereof and/or which lead to a reduction/elimination of distortions and/or which reduce/eliminate reflections and/or reduce/eliminate the other characteristic features that can lead to decoding errors. Each of the transformations can be tested; if they do not result in the desired success, they can be discarded, refined, changed and/or extended by further transformations.

Examples of transformations are: spatial low-pass filtering, spatial high-pass filtering, sharpening, blur (e.g. Gaussian blur), unsharp masking, erosion, median filter, maximum filter, reduction of contrast range, edge detection, reduction of colour depth, greyscale level conversion, negative creation, colour corrections (colour balance, gamma correction, saturation), colour replacement, Fourier transformation, Fourier low-pass filter, Fourier high-pass filter, inverse Fourier transformation.

Some transformations can be carried out by convolution of the raster graphics using one or more convolution matrices (referred to as: convolution kernel). The latter are usually square matrices having odd dimensions, which can have various sizes (for example 3×3, 5×5, 9×9 and/or the like). Some transformations can be represented as a linear system, wherein a discrete convolution, a linear operation, is applied. For discrete two-dimensional functions (digital images), the following calculation formula arises for the discrete convolution:

$$I*(x, y) = \sum_{i=1}^{n}\sum_{j=1}^{n} I(x-i+a,\ y-1+a)(k(i,\ j)$$

where I*(x, y) represents the result pixels of the transformed image recording and I is the original image recording to which the transformation is applied. a indicates the coordinate of the centre point in the square convolution matrix and k(i,j) is an element of the convolution matrix. In the case of 3×3 convolution matrices, n=3 and a=2; in the case of 5×5 matrices, n=5 and a=3.

Transformations and sequences of transformations are listed below which, in the case of apples, for example, have the effect that the transformed reference image recording generates fewer decoding errors than the non-transformed reference image recording:

- colour transformation into intensity-linear RGB signals
- colour transformation of the linear RGB signals into e.g. a reflection channel and/or an illumination channel and at least two colour channels for differentiating the coded and uncoded surface parts. For this purpose, the intensity-linear RGB colour signals are linearly combined among one another so as to effect the best possible differentiation between coded and uncoded surface parts.
- reflection correction by subtracting the reflection channel from the at least two colour channels (additive correction)
- illumination correction by normalizing the at least two colour channels to the illumination channel (multiplicative correction)
- correction of disturbances in the apple surface by detection of the disturbances and spatial interpolation from the surroundings of the imperfection
- unsharp masking of the illumination- and reflection-corrected image segments using a filter mask in terms of an extent, with the result that spatial inhomogeneities e.g. of the image brightness are well compensated for by the curved surface shape of the apple, and the image contrast between coded and uncoded surface parts is amplified and optimized by increasing the high-frequency image portions.

Further examples of transformations can be gathered from the numerous publications on the topic of digital image processing.

If a multiplicity of transformed reference image recordings have been generated, the training data can be used for training the machine learning model. In this case, the (non-transformed) reference image recordings are fed as input data to the model. The model is configured to generate an output image recording from one or more reference image recordings. The output image recording is compared with a transformed reference image recording (the target data). The deviations between the output image recording and the transformed reference image recording can be quantified with a loss function. The error values determined can be used to adapt model parameters of the machine learning model so that the error values are reduced. If the error values reach a predefined minimum, the model is trained and can be used for generating new transformed image recordings on the basis of new image recordings. In this case, the term "new" means that the corresponding image recordings were not used during the training of the model.

The machine learning model can for example be an artificial neural network or comprise such a network.

An artificial neural network comprises at least three layers of processing elements: a first layer with input neurons (nodes), an N-th layer with at least one output neuron (nodes) and N−2 inner layers, where Nis a natural number and greater than 2.

The input neurons serve to receive one or more image recordings. The output neurons serve to output transformed image recordings.

The processing elements of the layers between the input neurons and the output neurons are connected to one another in a predetermined pattern with predetermined connection weights.

The training of the neural network can, for example, be carried out by means of a backpropagation method. The aim here in respect of the network is maximum reliability of mapping of given input data onto given output data. The mapping quality is described by a loss function. The goal is to minimize the loss function. In the case of the backpropagation method, an artificial neural network is taught by the alteration of the connection weights.

In the trained state, the connection weights between the processing elements contain information regarding the relationship between image recordings and transformed image recordings.

A cross-validation method can be used in order to divide the data into training and validation data sets. The training data set is used in the backpropagation training of network weights. The validation data set is used in order to check the accuracy of prediction with which the trained network can be applied to unknown data.

In one particularly preferred embodiment, the machine learning model comprises a generative adversarial network (abbreviated to: GAN). Details concerning these and other artificial neural networks can be gathered from the prior art (see for example: M.-Y. Liu et al.: *Generative Adversarial Networks for Image and Video Synthesis: Algorithms and Applications*, arXiv:2008.02793; J. Henry et al.: Pix2Pix GAN for Image-to-Image Translation, DOI: 10.13140/RG.2.2.32286.66887).

Once the machine learning model has been trained, it can be used for generating new transformed image recordings on the basis of new image recordings.

The image recording (or a plurality of image recordings) is/are fed to the trained model and the model generates a transformed image recording.

In the transformed image recording, the optically readable code is recognizable and readable better than in the original (non-transformed) image recording (or the original image recordings in the case of a plurality of image recordings).

The optically readable code in the transformed image recording is read out (decoded) in a next step. Depending on the code used, here there are already existing methods for reading out (decoding) the respective code.

The code read out (decoded) can contain information concerning the object in his surface the code is introduced.

In one preferred embodiment, the code read out comprises a (unique) identifier, on the basis of which a consumer can acquire further information concerning the object for example from a database. The code read out and/or information linked with the code read out can be output, i.e. displayed on a screen, printed out on a printer and/or stored in a data storage medium.

Further information concerning such a (unique) identifier and the information which can be stored with respect to the object linked with the identifier and can be displayed to a consumer is described in the patent application EP3896629A1, the content of which shall be fully incorporated by reference in this description.

The invention is explained in more detail below with reference to drawings, without wishing to restrict the invention to the features and combinations of features that are shown in the drawings.

FIG. 1 shows by way of example and schematically the method for training the machine learning model.

The training of the machine learning model (MLM) is effected on the basis of training data (TD). The training data usually comprise, for each object of a multiplicity of objects, i) at least one reference image recording (RI) and ii) a transformed reference image recording (RI$^t$). Only one data set for one object is shown in FIG. 1. The object is an apple in the present example. An optical code has been introduced into a surface of the object. In the present example, a QR code has been introduced into the skin of the apple. Both the transformed reference image recording (RI) and the non-transformed image recording (RI) show the optically readable code introduced into a surface of the object. The transformed reference image recording (RI) may have been generated by an expert on the basis of the non-transformed image recording (RI). The expert may have been faced with the objective of determining for the non-transformed image recording (RI) one or more transformations which ensure that the readout of the optically readable code in the transformed reference image recording (RI') generates fewer decoding errors than the readout of the optically readable code in the non-transformed reference image recording (RI).

The reference image recording (RI) is fed to the machine learning model (MLM) (step 110). The machine learning model (MLM) is configured to generate an output image recording (I*) on the basis of the reference image recording (RI) and on the basis of model parameters (MP) (step 120). The output image recording (I*) is a predicted transformed reference image recording. The output image recording (I*) can be compared with the transformed reference image recording (RI$^t$). With the aid of a loss function (LF) it is possible to calculate a loss (L) between the output image recording (I*) and the transformed reference image recording (RI) (step 130), wherein the loss (L) is a quantification of the deviation between the output image recording (I*) and the transformed reference image recording (RI$^t$). The loss (L) can be used to modify model parameters (MP) with regard to reducing the deviation. This can take place in an optimization method, e.g. a gradient method.

The machine learning model (MLM) is trained on the basis of a multiplicity of reference image recordings as input data and transformed reference image recordings as target data. As a result, the model learns such transformations which lead to fewer decoding errors during readout.

Figure 2:
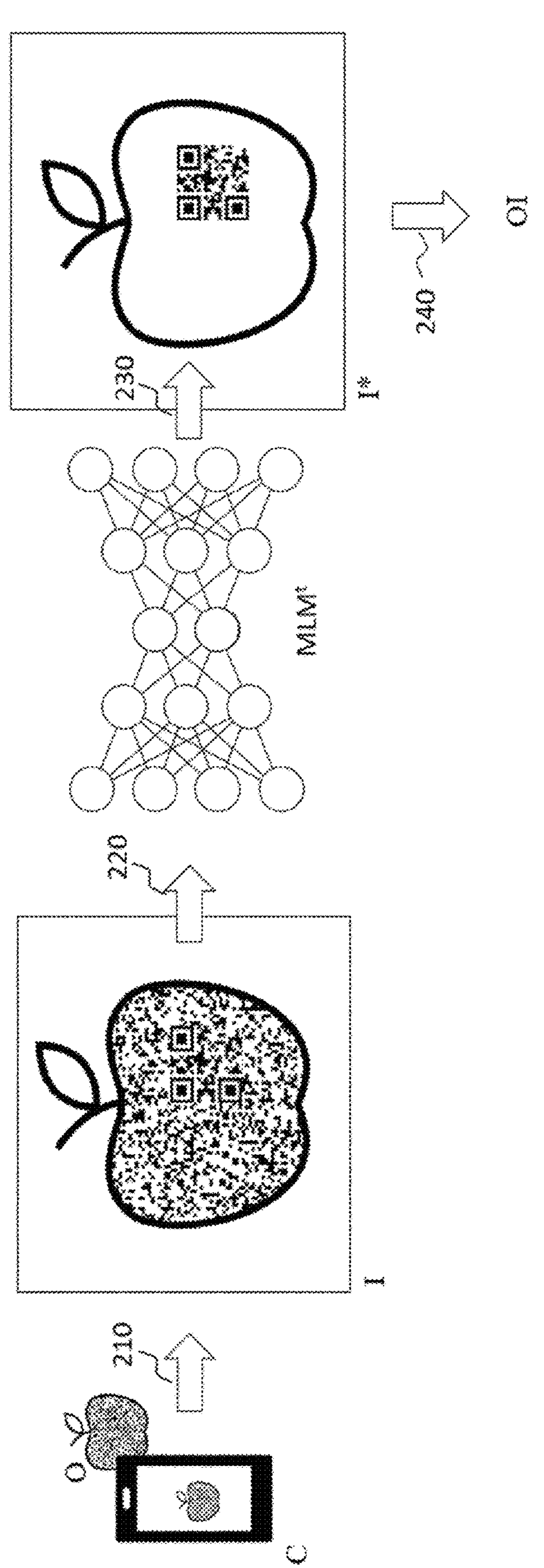

FIG. 2 shows schematically and by way of example in the form of a flowchart the readout of an optically readable code introduced into a surface of an object.

In a first step (210), a digital image recording (I) of the optically readable code introduced into the surface of the object (O) is generated with the aid of a camera (C). In a second step (220), the digital image recording (I) is fed to a trained machine learning model (MLM$^t$). The machine learning model (MLM') is configured and trained to generate a transformed image recording (I*) on the basis of the image recording (I). The training of the machine learning model (MLM$^t$) can be carried out as described in relation to FIG. 1. In a third step (230), the machine learning model (MLM$^t$) supplies the transformed image recording (I*), in which an optically readable code (in this case a QR code) introduced into a surface of the object (O) has a higher contrast with respect to the surroundings thereof and is thus more clearly recognizable and easier to read out than the optically readable code in the case of the non-transformed image recording (I). In a fourth step (140), the optically readable code is read out and the code (OI) read out is provided. The code (OI) read out can be displayed and/or information concerning the object (O), on the basis of the code (OI) read out, can e.g. be read out from a database and provided (e.g. communicated and displayed).

Figure 3:
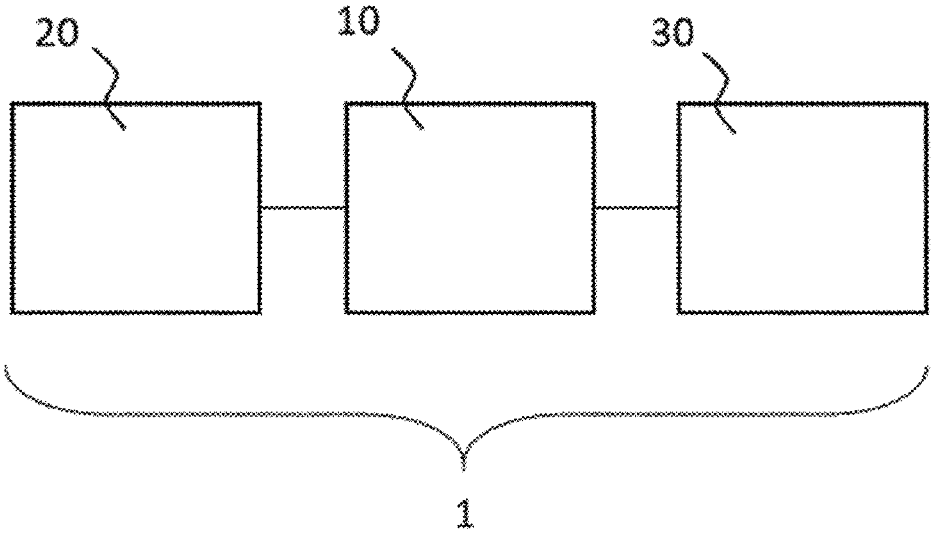

FIG. 3 shows by way of example and schematically a system according to the invention.

The system (1) comprises a computer system (10), a camera (20) and one or more data storage media (30). Image recordings of objects can be generated with the aid of the camera (20). The camera (20) is connected to the computer system (10), such that the image recordings generated can be transmitted to the computer system (10). The camera (20) can be connected to the computer system (10) via a cable connection and/or via a radio connection. A connection via one or more networks is also conceivable. It is furthermore conceivable for the camera (20) to be an integral part of the computer system (10), as is the case for example for present-day smartphones and tablet computers.

The computer system (10) is configured (for example by means of a computer program) to receive one or more image recordings (from the camera or from a data storage medium), to generate a transformed image recording, to decode the optical code in the transformed image recording and to output the decoded code and/or to provide information linked with the decoded code.

Image recordings, models, model parameters, computer programs and/or other/further information can be stored in the data storage medium (30). The data storage medium (30) can be connected to the computer system (10) via a cable connection and/or via a radio connection. A connection via one or more networks is also conceivable. It is furthermore conceivable for the data storage medium (30) to be an integral part of the computer system (10). It is furthermore conceivable for a plurality of data storage media to be present.

Figure 4:
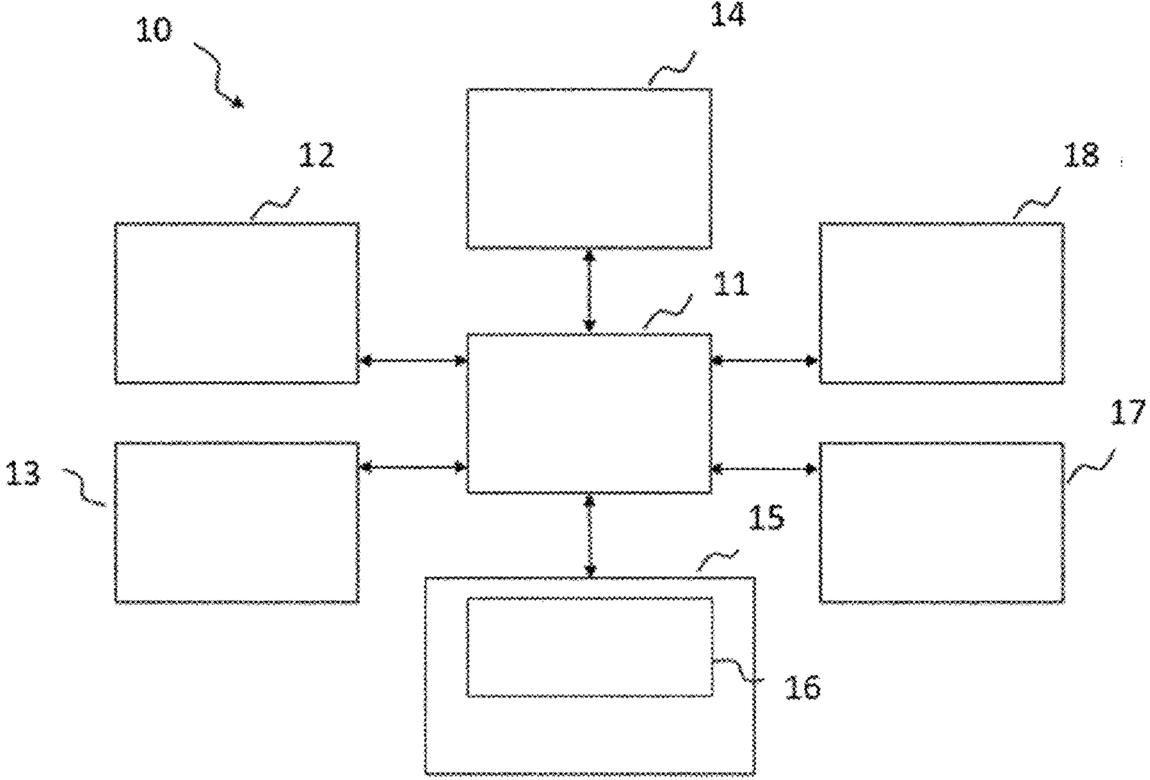

FIG. 4 schematically shows a computer system (10). Such a computer system (10) can comprise one or more stationary or portable electronic devices. The computer system (10) can comprise one or more components, such as e.g. a processing unit (11) connected to a storage medium (15).

The processing unit (11) can comprise one or more processors alone or in combination with one or more storage media. The processing unit (11) can involve customary computer hardware that is able to process information such as e.g. digital image recordings, computer programs and/or other digital information. The processing unit (11) usually consists of an arrangement of electronic circuits, some of which can be embodied as an integrated circuit or as a plurality of integrated circuits connected to one another (an integrated circuit is sometimes also referred to as a “chip”). The processing unit (11) can be configured to execute computer programs which can be stored in a main memory of the processing unit (11) or in the storage medium (15) of the same or of a different computer system.

The storage medium (15) can be customary computer hardware that is able to store information such as e.g. digital image recordings, data, computer programs and/or other digital information either temporarily and/or permanently. The storage medium (15) can comprise a volatile and/or non-volatile storage medium and can be fixedly built in or removable. Examples of suitable storage media are RAM (Random Access Memory), ROM (Read-Only Memory), a hard disk, a flash memory, an exchangeable computer floppy disk, an optical disc, a magnetic tape or a combination of the aforementioned. The optical discs can include compact discs with read-only memory (CD-ROM), compact discs with a read/write function (CD-R/W), DVDs, Blu-ray discs and the like.

In addition to the storage medium (15), the processing unit (11) can also be connected to one or more interfaces (12, 13, 14, 17, 18) in order to display, to transmit and/or to receive information. The interfaces can comprise one or more communication interfaces (17, 18) and/or one or more user interfaces (12, 13, 14). The one or more communication interfaces can be configured such that they transmit and/or receive information, e.g. to and/or from a camera, other computers, networks, data storage media or the like. The one or more communication interfaces can be configured such that they transmit and/or receive information via physical (wired) and/or wireless communication connections. The one or more communication interfaces can contain one or more interfaces for connection to a network, e.g. using technologies such as mobile telephone, Wi-Fi, satellite, cable, DSL, optical fibre and/or the like. In some examples, the one or more communication interfaces can comprise one or more close-range communication interfaces configured such that they connect devices with close-range communication technologies such as NFC, RFID, Bluetooth, Bluetooth LE, ZigBee, infrared (e.g. IrDA) or the like.

The user interfaces (12, 13, 14) can comprise a display (14). A display (14) can be configured such that it displays information to a user. Suitable examples thereof are a liquid crystal display (LCD), a light-emitting diode display (LED), a plasma display panel (PDP) or the like. The user input interface(s) (12, 13) can be wired or wireless and can be configured so as to receive information from a user into the computer system (10), e.g. for processing, storage and/or display. Suitable examples of user input interfaces are a microphone, an image or video recording device (e.g. a camera), a keyboard or a keypad, a joystick, a touch-sensitive surface (separate from a touchscreen or integrated therein) or the like. In some examples, the user interfaces can contain an automatic identification and data capture technology (AIDC) for machine-readable information. That can include barcodes, radio-frequency identification (RFID), magnetic strips, optical character recognition (OCR), integrated circuit cards (ICC) and the like. The user interfaces can furthermore comprise one or more interfaces for communication with peripherals such as printers and the like.

One or more computer programs (16) can be stored in the storage medium (15) and can be executed by the processing unit (11), which is thereby programmed to fulfil the functions described in this description. The fetching, loading and execution of instructions of the computer program (16) can be effected sequentially, such that a respective instruction is fetched, loaded and executed. However, the fetching, loading and/or execution can also be effected in parallel.

The system according to the invention can be embodied as a laptop, notebook, netbook, tablet PC and/or handheld device (e.g. smartphone). Preferably, the system according to the invention comprises a camera.

Figure 5:
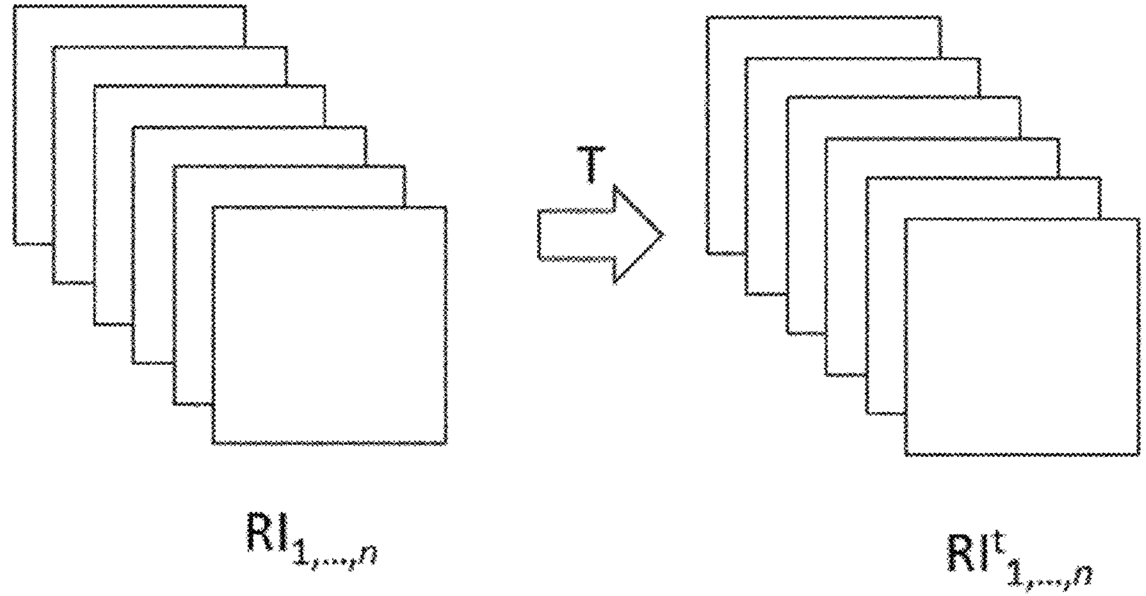

FIG. 5 shows by way of example and schematically the generation of a training data set for training a machine learning model. On the basis of the training data set, the machine learning model can be trained to carry out one or more transformations of image recordings.

The generation of a training data set can be a manual process carried out by one or more experts. The starting point in the present example is a number n of reference image recordings $RI_1$ to $RI_n$, where n is an integer that is preferably greater than 100. Each reference image recording shows an optical code introduced into a surface of an object. Preferably, each reference image recording shows an optically readable code introduced into a different specimen of an object. The object can be an apple, for example; in that case, each reference image recording preferably shows an optically readable code in different apple specimens.

If the reference object is always the same, such as e.g. an apple, then the training data set can be used to train a machine learning model to reduce and/or eliminate disturbances in image recordings of optically readable codes introduced in apples.

If there are different reference objects, such as, for example, different fruits (e.g. apples and pears), the training data set can be used to train a machine learning model to reduce and/or eliminate disturbances in image recordings of optically readable codes introduced in different fruits. The more different (the greater the number of variants of) the reference objects imaged in the reference image recordings, the greater the amount of training data required and the more diversely the trained machine learning model can be used. A machine learning model which has been trained only on the basis of reference image recordings of apples of a defined variety, when used for reading out codes on bananas, will achieve worse results than a model which has been trained on the basis of reference image recordings of apples of different varieties and of bananas. The optically readable code imaged in the reference image recordings can likewise be identical or different in all of the reference image recordings.

In the present example (FIG. 5), at least one expert generates a transformed reference image recording from a respective reference image recording. As described in this description, a plurality of reference image recordings can also be combined to form a transformed reference image recording. A transformed reference image recording is generated by the reference image recording being subjected to one or more transformations. What transformation(s) is/are carried out, and in what order the transformations are carried out in the case of a plurality of transformations, will be stipulated by the at least one expert on the basis of his/her expert knowledge. The aim of the transformation(s) is to generate from at least one reference image recording a transformed reference image recording in which there are fewer disturbances and the probability of the occurrence of decoding errors is thus reduced.

Disturbing factors are features of the object and/or of the optically readable code introduced into a surface of the object which lead to disturbances in the at least one image recording.

Such disturbances are for example distortions, light reflections, code elements having different colourings and/or sizes and/or the like.

Disturbing factors and disturbances can have the effect that elements of an optically readable code such as are imaged in the at least one image recording are not recognized or are misinterpreted.

Disturbing factors and disturbances can have the effect that features of the object such as is imaged in the at least one image recording are interpreted as features of an optical code even though they are not part of the optically readable code.

One or more disturbances in the at least one image recording are reduced and/or eliminated with the aid of the present invention. This is done with the aid of one or more transformations.

The invention claimed is:

1. A method of training a machine learning model, comprising:

providing training data for a plurality of objects, the training data for each object of the plurality of objects comprising:

i) at least one reference image of an optical code which is incorporated into a surface of the object of the plurality of objects; and ii) a transformed reference image of the optical code;

wherein decoding of the optical code in the transformed reference image produces fewer decoding errors than the decoding of the optical code in the reference image;

providing a machine learning model, wherein the machine learning model is configured to generate a second image based on at least a first image and based on model parameters;

training the machine learning model, the training comprising for each object of the plurality of objects:

inputting the at least one reference image into the machine learning model;

receiving a predicted transformed reference image from the machine learning model;

calculating a deviation between the transformed reference image and the predicted transformed reference image;

modifying the model parameters to reduce the deviation;

storing and/or outputting the trained machine learning model;

and/or transmitting the trained machine learning model to a separate computer system; and and/or using the trained machine learning model to generate a transformed image of at least one new image of a different object.

2. The method according to claim 1, wherein for each object the transformed reference image is generated by applying one or more transformations to the at least one reference image.

3. The method according to claim 2, wherein the one or more transformations are selected such that reading the optical code in the transformed reference image leads to fewer decoding errors than reading the optical code in the at least one reference image.

4. The method according to claim 2, wherein the one or more transformations are determined empirically.

5. The method according to claim 1, wherein the plurality of objects are different specimens of a plant product or animal product.

6. The method according to claim 1, wherein the plurality of objects are different specimens of a drug.

7. The method according to claim 1, wherein the machine learning model comprises an artificial neural network.

8. The method according to claim 1, wherein the optical code has been introduced into the surface of the object by means of a laser.

9. The method according to claim 1, wherein the optical code is a matrix code or a bar code.

10. The method according to claim 1, wherein the optical code comprises alphanumeric characters.

11. A computer-implemented method for decoding an optical code that is introduced onto a surface of an object, the method comprising:

receiving an image of the optical code;

supplying the image to a trained machine learning model, the trained machine learning model having been trained in a method according to claim 1;

receiving a transformed image from the trained machine learning model; and decoding of the optical code depicted in the transformed image.

12. The method of claim 11, further comprising:

outputting the decoded optical code and/or information associated with the decoded code.

13. A system comprising:

at least one processor, wherein the processor is configured to;

receive an image of an optical code, wherein the optical code is incorporated onto a surface of an object;

supply the image to a trained machine learning model, the trained machine learning model having been trained according to claim 1;

receive a transformed image from the trained machine learning model; and decode the optical code imaged in the transformed image.

14. The system of claim 13, wherein the processor is configured to output the decoded code or information associated with the decoded code.

15. A computer program product comprising a data carrier on which a computer program is stored, wherein the computer program can be loaded into a main memory of a computer system and causes the computer system to perform:

receiving an image of an optical code, the optical code being incorporated onto a surface of an object;

supplying the image to a trained machine learning model, the trained machine learning model having been trained according to claim 1;

receiving a transformed image from the trained machine learning model;

decoding the optical code depicted in the transformed image; and outputting the decoded optical code and/or information associated with the decoded code.

* * * * *